(12) United States Patent
Zhang et al.

(10) Patent No.: US 10,387,174 B2
(45) Date of Patent: Aug. 20, 2019

(54) EXTENDED DESKTOPS IN VIRTUAL DESKTOP ENVIRONMENTS

(71) Applicant: VMware, Inc., Palo Alto, CA (US)

(72) Inventors: Yanchao Zhang, Beijing (CN); Yang Liu, Beijing (CN); Michael Zhang, Beijing (CN); Helena Zhang, Beijing (CN); Lin Lv, Beijing (CN); Cherry Zhou, Beijing (CN)

(73) Assignee: VMware, Inc., Palo Alto, CA (US)

( * ) Notice: Subject to any disclaimer, the term of this patent is extended or adjusted under 35 U.S.C. 154(b) by 251 days.

(21) Appl. No.: 15/348,630

(22) Filed: Nov. 10, 2016

(65) Prior Publication Data
US 2018/0129510 A1    May 10, 2018

(51) Int. Cl.
| | | |
|---|---|---|
| *G06F 3/14* | (2006.01) | |
| *G06F 9/451* | (2018.01) | |
| *G09G 5/38* | (2006.01) | |
| *H04L 29/06* | (2006.01) | |
| *H04L 29/08* | (2006.01) | |
| *G09G 5/14* | (2006.01) | |

(52) U.S. Cl.
CPC ............ *G06F 9/452* (2018.02); *G06F 3/1423* (2013.01); *G09G 5/38* (2013.01); *H04L 67/08* (2013.01); *H04L 67/141* (2013.01); *H04L 67/38* (2013.01); *G06F 3/1446* (2013.01); *G06F 3/1454* (2013.01); *G09G 5/14* (2013.01); *G09G 2340/0464* (2013.01)

(58) Field of Classification Search
CPC ....................................................... G06F 3/167
USPC .......................................... 715/779, 781, 751
See application file for complete search history.

(56) References Cited

U.S. PATENT DOCUMENTS

| | | | | |
|---|---|---|---|---|
| 9,032,325 B2* | 5/2015 | Janssen | ................. | G06F 3/0481 715/769 |
| 2003/0229900 A1* | 12/2003 | Reisman | ........... | G06F 17/30873 725/87 |
| 2006/0010392 A1* | 1/2006 | Noel | ..................... | G06F 3/0481 715/759 |
| 2007/0150810 A1* | 6/2007 | Katz | ..................... | G06F 3/0481 715/229 |
| 2011/0271208 A1* | 11/2011 | Jones | .................. | H04L 12/1822 715/753 |
| 2015/0135214 A1* | 5/2015 | Reisman | .......... | H04N 21/64322 725/37 |

* cited by examiner

*Primary Examiner* — Cao H Nguyen

(57) ABSTRACT

Systems and methods are provided for extending a remote desktop to a multi monitor configuration, with each monitor being viewable via a separate web client or native client, where the clients may further be executing on separate computing devices. After an initial remote desktop session is initiated via a first client, a second session with the remote desktop can be requested via a second client, which may be a web client or a native client executing on the same or different computing device as the first client. The remote desktop can be reconfigured to two monitor mode including a first and a second monitor. The graphical data of the first monitor can be streamed to the first client and the graphical data of the second monitor can be streamed to the second client. Consequently, the remote desktop can be extended to additional monitors in the same way.

20 Claims, 8 Drawing Sheets

EXTENDED DESKTOPS IN VIRTUAL DESKTOP ENVIRONMENTS

TECHNICAL FIELD

The present disclosure generally relates to techniques for extending desktops of computing devices to multiple displays and more specifically to techniques for extending desktops in remote or virtual desktop environments.

BACKGROUND

The use of multiple monitors to display the graphical user interface (GUI) of a desktop, known as "multi-monitor", is becoming increasingly commonplace in today's work environments. Extending a desktop across two or more monitors gives the user additional desktop area to work in and allows her to be more efficient and organized. For example, with multiple monitors, the user can open and use different applications or documents on different displays and multi-task more efficiently than with single monitor setups. Accordingly, the multi-monitor capability has become an important feature for both the convenience and efficiency of users.

Generally, to enable the multi-monitor mode on a traditional computer, a user simply connects multiple displays to the computer and configures the operating system (OS) through a built-in feature to extend the desktop across the displays. For example, the OS can identify which monitors are connected and collect certain information about each monitor, such as the monitor make, model, resolution, etc. The user can input certain other information that the system can't determine itself, such as the relative position of the monitors to each other, the primary monitor, each monitor's pivot (e.g., horizontal or vertical), etc. Once the information is input by the user, the OS can extend the desktop across the multiple displays in a configuration that is based on the collected information about the monitors and the information input by the user.

At the same time, with the rising popularity of cloud computing, remote desktop environments, such as those based on Virtual Desktop Infrastructure (VDI) and Desktop-as-a-Service (DAAS), are becoming increasingly prominent in the enterprise. In a conventional VDI or DAAS environment, a user is provisioned a virtual desktop and is allowed to access his or her virtual desktop over a remote network connection, such as a WAN connection. The virtual desktops are typically hosted on servers that reside in a data center of the enterprise (or a third-party service provider), and each host server may execute multiple virtual desktops. Users can utilize a client device to remotely log into their individual virtual desktops and all of the application execution takes place on the remote host server, which is linked to the local client device over the network, using a remote display protocol such as remote desktop protocol (RDP), PC-over-IP (PCoIP) protocol, virtual network computing (VNC) protocol, or the like. In the case where a web-based client such as an internet browser is implemented on the client device, the utilized protocol may be the Hypertext Transfer Protocol (HTTP). Using such a remote desktop protocol, the user can interact with applications of the virtual desktop, which are running on the remote host server, such that the display (i.e., image data), sound, keyboard, mouse, and other input/output information is communicated between the local client device and the server. A common implementation of this approach is to host multiple desktop operating system instances on a server hardware platform running a hypervisor.

Each client device in the remote desktop environment has a client executing thereon to perform client-side functions of the remote desktop operations, such as the conveying of inputs from the client device to the virtual desktop on the server and the receiving of outputs from the virtual desktop. The client can be a stand-alone, designated application for accessing the remote desktop, known as a "native client", and such native clients typically need to be downloaded and installed on the end user's device. The client can also be a standard internet browser, such as Firefox, available from the Mozilla Foundation; Chrome, available from Google, Inc.; Internet Explorer, available from Microsoft Corporation, etc., known as a "web-client". In some cases, a plug-in can be used to modify or configure a standard internet browser for remote desktop applications.

Thus, to access a remote desktop, a user can open a native client on her desktop, log into the remote desktop, and interface with the remote desktop via the native client. Or, when using a web-client, the user can open a web browser, enter a Uniform Resource Locator (URL) corresponding to the virtual desktop into the web browser (or select/execute a link), log into her virtual desktop, and interface with the remote desktop via the browser.

As with locally executing machines, the multi-monitor feature is desirable for users of remotely executing desktops. However, in a remote desktop infrastructure, enabling the multi-monitor mode poses several challenges. For example, in a traditional remote desktop environment, the remote desktop cannot be extended across multiple monitors at the client device in the same way that a locally executing desktop can be extended across multiple monitors (as described above) because the virtual desktop actually executes on a server that is remote from the client device to which the multiple monitors are connected. To address this issue, some companies have developed native clients with multi-monitor capabilities that allow a user to extend a remote desktop to multiple monitors on the client device. An example of such a product is the VMware Horizon View by VMware, Inc.

However, several inefficiencies remain. In many cases, a user may prefer to, or only have the option of, accessing a remote desktop using a web client, which does not support multi-monitor functions like some native clients, such as the VMware Horizon View. For example, it may be inconvenient for a user to download and install a native client, the user may be unable to install a native client, or a native client may not be available to a user or for the user's device. In this case, the user might be unable to access the remote desktop in multi-monitor mode.

Further, with the proliferation of mobile devices, it would be desirable if in addition to extending a remote desktop to a monitor connected to the client device, a user also had the option of using the monitor of another device, e.g., a smart phone, tablet, laptop, another computer, etc. for extending the remote desktop. For example, so that a user accessing her remote desktop on a desktop computer could extend the remote desktop not only to another screen connected to her desktop computer but also to the screen of her tablet.

A more efficient approach is desirable for managing multi-monitor capabilities in remote desktop environments.

DETAILED DESCRIPTION

Figure 1:
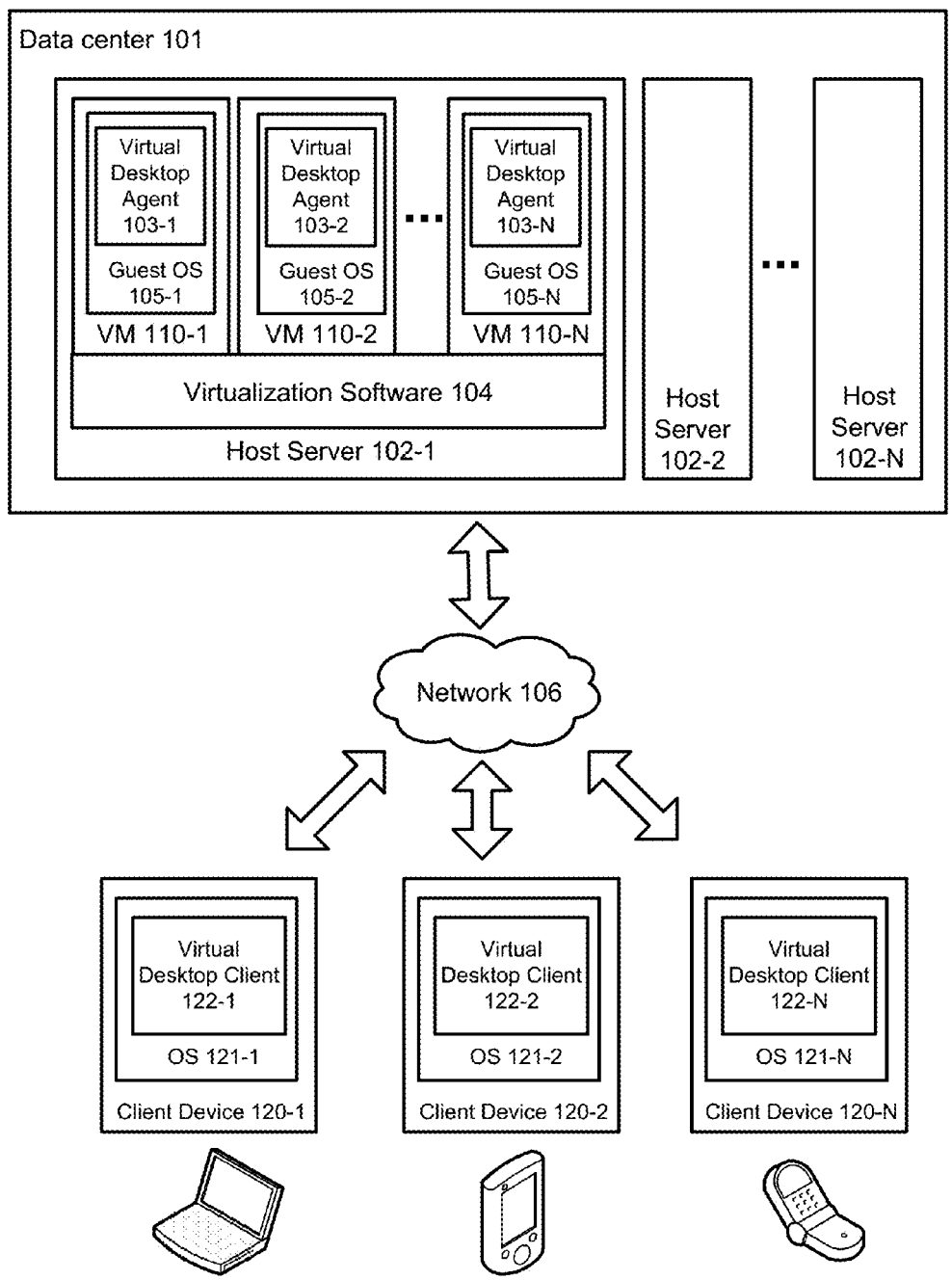
FIG. 1 illustrates an example of a virtual desktop environment, in accordance with various embodiments.

Systems and methods in accordance with various embodiments of the present disclosure overcome at least some of the above-mentioned shortcomings and deficiencies by providing more efficient ways to enable multi-monitor capabilities in remote desktop environments. In particular, embodiments described herein provide ways to extend remote desktops to multiple monitors, including a way to enable such multi-monitor capability when using web clients. Described embodiments further provide ways for extending a remote desktop across different and separate client computing devices, such as tablets, smart phones, laptops, and the like.

More particularly, systems and methods are provided for extending a remote desktop to a multi monitor configuration, with each monitor being viewable via a separate web client or native client, where the clients may be executing on the same computing device or on separate computing devices. After an initial remote desktop session is initiated via a first client, a second session with the remote desktop can be initiated via a second client, which may be a web client or a native client executing on the same or different computing device as the first client. The remote desktop graphical user interface (GUI) can be reconfigured to two monitor mode including a first and a second monitor. The graphical data of the first monitor can be streamed to the first client and the graphical data of the second monitor can be streamed to the second client. Consequently, the remote desktop can be extended to additional monitors in the same way. Hence, the user is able to view each of multiple monitors of the remoted desktop GUI in a separate client. The user may place each of the clients on separate screens, which may be on separate devices, as desired, to view the remote desktop GUI in a multi-monitor configuration on the client side.

In various embodiments, a user can initiate a remote desktop session from a client computing device by logging into the remote desktop executing on a server from a client application or "client" running on the user's client device. The client can be a native client or a web client. Once an initial session is active, to extend the remote desktop to an additional monitor that is connected to the client computing device, the user can initiate a second session with the remote desktop. For example, if the user is using a web client, the user can open another browser window on the client device and perform a second log-in into the remote desktop from the second browser to initiate the second session. If the user is using a native client, the user can open a second instance of the native client and initiate the second session through the second client instance.

When the server detects the second login by the user to the virtual desktop, the server can reconfigure the remote desktop GUI to two monitor mode and bind the second session to the second monitor while the first session continues to be bound to the first monitor. In this way, the first monitor of the remote desktop GUI continues to be streamed to the first client instance or, if a web client is used, to the first browser window, and the second monitor is streamed to the second client instance or, if a web client is used, to the second browser window. In some embodiments, extending the GUI to the dual monitor mode can happen automatically when the second login is detected, while in other embodiments, the system may display a message to the user, letting the user select either extending the monitor configuration to the dual mode or simply stealing the session from the previously established session.

Thus, with the two monitors of the remote desktop GUI being streamed via the corresponding two sessions, a multi-monitor configuration can be achieved at the client device by displaying one session on one display and the other session on another display. For example, in the case of web clients, the user can drag or place the first browser window showing the first session to one display connected to the client device and the second browser window showing the second session to another display connected to the client device.

In the same way, by starting third and subsequent sessions from additional client instances or browser windows, the remote desktop can be extended to additional displays. Further, in order to properly configure the monitors on the remote desktop GUI, each time an additional monitor is added, the server can provide a prompt to the user to collect topology information about the screens, such as the relative position of the screens to each other, the pivot (horizontal or vertical) of each screen, as well as which screen is primary.

In the same way that a second and subsequent sessions can be initiated on the same client device to extend the remote desktop GUI to additional displays that are connected to the client device, the second and subsequent sessions can be initiated from other client devices to extend the remote desktop GUI to monitors connected to or part of the other client devices. For example, the second session can be initiated by the user from a client (native or web based) on a second client device. When the server detects the request for the second session, it can reconfigure the remote desktop GUI to two monitor mode and bind the second monitor to the second session with the second client device, while the first monitor continues to be bound to the first session with the first client device. In this way, the graphical data of the first monitor of the extended desktop GUI continues to be streamed to the client on the first client device and displayed on a screen of the first client device, and the graphical data of the second monitor of the extended desktop GUI is streamed to the client on the second client device and displayed on a screen of the second client device.

Numerous advantages are realized as a result. For example, a user is able to extend her remote desktop GUI to multiple monitors and across different devices. A remote desktop GUI can be extended to additional monitors regardless of whether a native or a web client is used. Further, the monitor(s) of separate additional devices, such as tablets, smartphones, laptops, etc. may be utilized for displaying extended monitors of the remote desktop GUI.

For example, a user may be able to initiate a first remote desktop session from her personal computer via a web client, then extend the remote desktop to a second display connected to her personal computer by initiating a second session from her personal computer via a second instance of a web client on her computer, then extend the remote desktop to a third display on her tablet by initiating a third session via a web client on the tablet. Further, the sessions on any of her devices can be initiated via either native clients or web clients.

As used throughout this disclosure, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device even though the desktop is actually executing remotely.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2A:
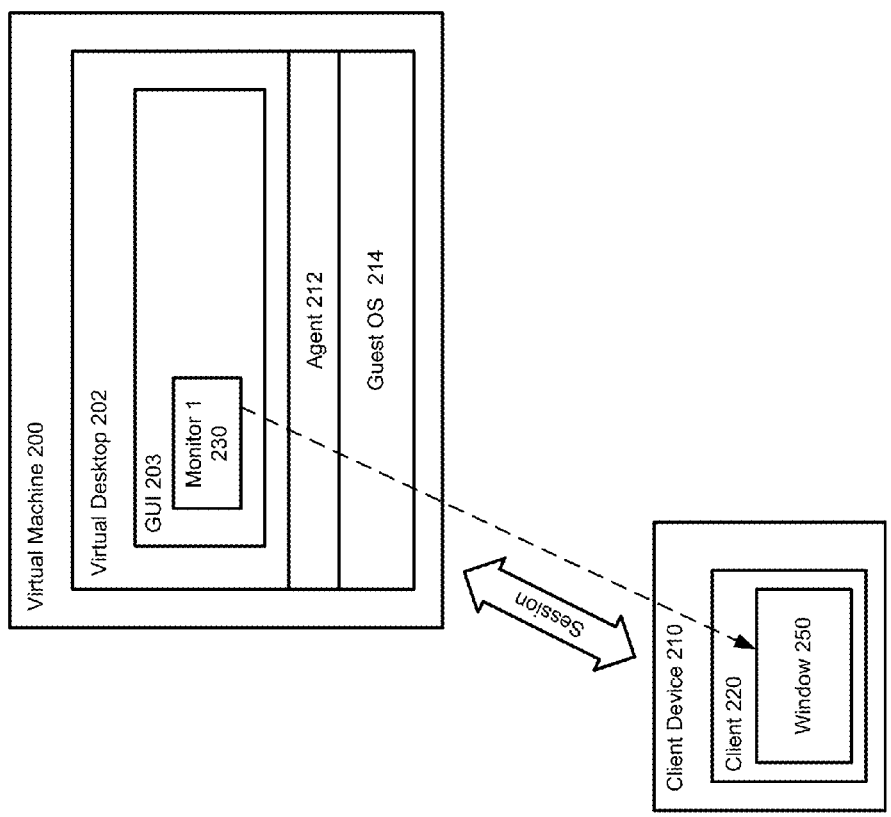
FIG. 2A illustrates an example of a client on a client device connecting to a virtual desktop in single monitor mode, in accordance with various embodiments.

FIG. 2A illustrates an example of a client on a client device connecting to a virtual desktop in single monitor mode, in accordance with various embodiments. As illustrated in the example of FIG. 2A, a virtual desktop 202 is presented by a guest operating system 214 running on a virtual machine 200. The virtual machine 200 may be further hosted on a host server in a data center (not pictured). A user of a remote client device 210 can access and interact with the virtual desktop 202 over a network via a client 220 running on the client device 210 and an agent 212 running on the guest OS 214.

In various embodiments, the client 220 can be a native client, such as a stand-alone, designated application for accessing the remote desktop 202. The client 220 can also be a web client, such as a standard internet browser (e.g., Firefox, available from the Mozilla Foundation; Chrome, available from Google, Inc.; Internet Explorer, available from Microsoft Corporation, etc.). In some cases, a plug-in can be used to modify or configure a standard internet browser in in such remote desktop applications.

To access the remote desktop 202, a user of client device 210 can initiate a session with the virtual desktop 202 by logging into the virtual desktop 202 via the client 220. For example, if the client 220 is a web client, the user can open a web browser, enter a Uniform Resource Locator (URL) corresponding to the virtual desktop 202 into the web browser (or select/execute a link), and log into the virtual desktop 202 by providing login credentials, such as a username and a password. A connection broker (not pictured), which may also be a connection server, can verify the credentials entered by the user. If the credentials are accepted, the connection broker can allow a connection between the client 220 and the agent 212, thereby establishing a session between the client 220 and the virtual desktop 202. Subsequently, the user can interface with the remote desktop 202 via the browser window, i.e., the client 220. Similarly, if client 220 is a native client, the user can open the native client application on the client device 210, log into the remote desktop via the native client application, and interface with the remote desktop via the native client application (i.e., the client 220) once the connection broker verifies credentials and establishes the session.

As used herein, the terms "connection broker", "broker", and "connection server" are used interchangeably and refer to a module or a server that establishes and manages connections between clients and agents. In general, the broker operates by receiving login credentials for a remote desktop from a client, verifying whether the login credentials are accurate, and allowing the connection if the credentials are valid.

As illustrated, a graphical user interface (GUI) 203 of the desktop 202 is generated on the virtual machine 200. The GUI 203 (i.e., the graphical data of the GUI) is transmitted over the network to the client 220, where it is displayed in a window 250 corresponding to the client 220. For example, if the client 220 is a web browser, then the transmitted GUI 203 graphical data can be displayed in the browser window. If the client 220 is a native client, then the transmitted GUI 203 graphical data can be displayed in a window of the native client application.

In this case, the desktop 202 is in one monitor mode. Hence, the guest operating system 214 is configured to produce the GUI 203 of the desktop 202 on the single monitor 1 230. Accordingly, monitor 1 230 is transmitted or streamed to client 220, where the image data of monitor 1 230 is displayed in the window 250 of the client (e.g., in a web browser window or a native client application window), as illustrated by the broken arrow. For example, display updates of monitor 1 230 can be conveyed to client 220 and displayed in the client window 250. The user of client device 210 can, accordingly, place the client window 220 in a screen that is part of or connected to the client device 210, and optionally maximize the window to view and interact with the GUI 203 of the virtual desktop 202 on the client device.

It should be noted that, throughout this disclosure, when reference is made to a monitor (e.g., 230) of a remote desktop GUI (e.g., 203) being "streamed" or "transmitted", it means that the graphical data or image data corresponding to the monitor (e.g., 230) that is produced in the GUI 203 on the desktop 202 is being conveyed.

Further, the user can provide inputs (such as mouse, keyboard, or other inputs) to the desktop 202 via the connection between the client 220 and agent 212. For example, user inputs at the client device 210 that are targeted for the virtual desktop 202 can be conveyed by the client 220 to the agent 212. The agent 212 can inject the user inputs into the desktop 202, thereby allowing the user to provide inputs to the desktop 202.

In various embodiments, the client 220 can collect various topology information corresponding to the window 250 and send this information to the agent 212, so that the information can be used to configure the GUI 203 that is produced by the virtual desktop 202. Such information can be, for example, the size of the window 250 (e.g., 1033 pixels×768 pixels). For example, in the case of a web client, topology information sent by the client 220 can include the size of the web browser window. The guest OS 214 can then use the information to configure the GUI 203 and/or the size of monitor 1 230. In the case of a native client, topology information sent by the client 220 can include the size of the native client application window.

Figure 2B:
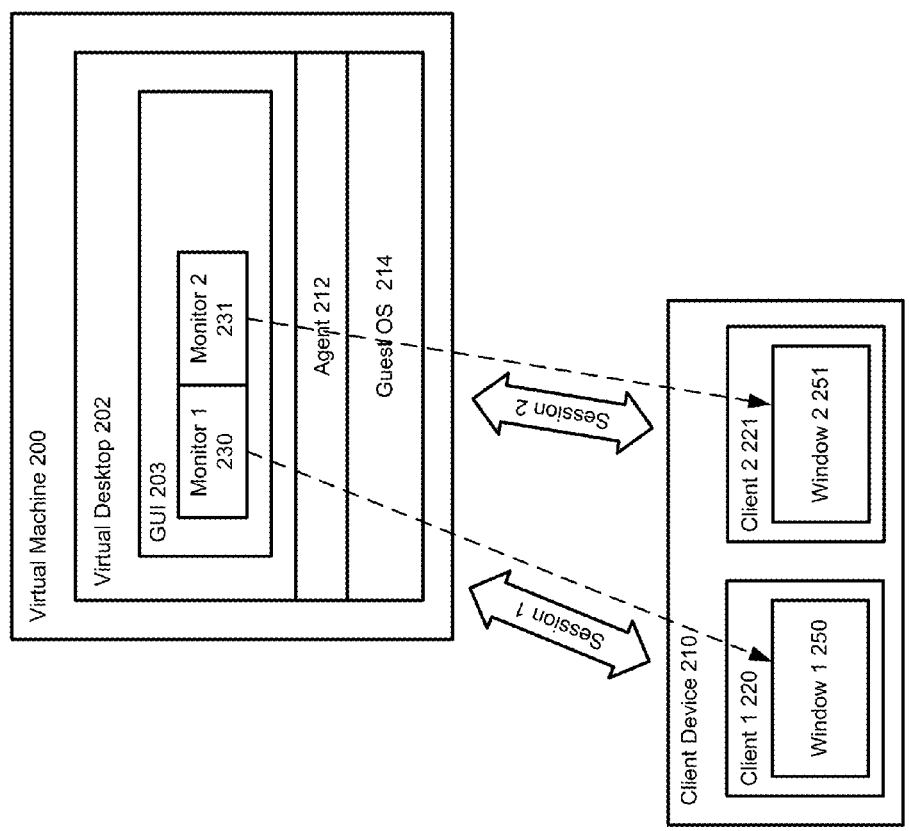
FIG. 2B illustrates an example of two clients on a client device connected to an extended virtual desktop in a two monitor configuration, in accordance with various embodiments.

FIG. 2B illustrates an example of a client device executing two clients connected to an extended virtual desktop in a two monitor configuration, in accordance with various embodiments. FIG. 2B illustrates the client device 210 and virtual desktop 202 described in FIG. 2A, now extended to a two monitor configuration. In various embodiments, to extend the desktop GUI 203 to a second monitor 2 231 (i.e., to configure the GUI 203 in two monitor mode), the user of the client device 210 can open a second client 2 221 on the client device 210. For example, in the case of a web client, this can be performed by opening a second web browser window. In the case of a native client, this can be performed by, for example, opening a second instance of the native client application or by opening a second window of the native client application. Notably, client 1 220 and client 2 221 may be different types of clients, e.g., client 1 220 may be a web client and client 2 221 may be a native client or vice versa. Both clients 220, 221 can be web clients. Or, both clients 220, 221 can be native clients.

Once the second client 2 221 is opened on the client device 210, the user can log into the remote desktop 202 through the second client 2 221 (e.g., by providing login credentials to the connection broker). In various embodiments, when the connection broker detects that a second login is being requested to the same virtual desktop 202 (after determining that the supplied credentials are correct) the connection broker can request the user to identify (e.g., via an on-screen prompt), whether the user prefers to steal the session from client 1 220 or to extend the session to the additional client 2 221. If the user chooses to steal the session, then the connection broker can terminate the session with client 1 220 and establish the session with client 2 221. If the user chooses to extend the session to client 2 221, then the connection broker can allow the second session with client 2 221 while maintaining the first session with client 1 220.

When the second session to the virtual desktop 202 is requested, the GUI 203 of the virtual desktop 202 can be extended to a second monitor 2 231, and the second monitor 2 231 can be transmitted via the second session while the first monitor 1 230 continues to be transmitted via the first session. Hence, the desktop 202 can be extended to two monitors (230 and 231) in the virtual machine 200 on the server, and each monitor can be conveyed to and displayed by a separate client (220 and 221) on the client device 210. As illustrated by the broker arrow, monitor 2 231 can be transmitted or streamed via session 2 to a window 2 251 of the second client 2 221 in the client device 210. For example, display updates of monitor 2 231 can be conveyed to client 2 221 and displayed in the client 2 window 251. Meanwhile, the first monitor 1 230 can be streamed or transmitted via session 1 to the first client 1 220 to be displayed in window 1 250.

For example, when the agent 212 detects or is notified by the connection broker that a second connection to the virtual desktop 202 is being established, the agent 212 can reconfigure the desktop 202 to two monitor mode. For example, the agent can do this by communicating with or invoking certain operation of the guest OS 214.

In various embodiments, the user can be prompted (e.g., by an on-screen prompt) to supply various topology information that can be used (e.g., by the agent 212 and/or by the guest OS 214) to configure the GUI 203 of the virtual desktop 202 for multi-monitor mode. In an embodiment, such a prompt can be presented to the user when the user attempts to establish the second connection to the desktop 202, after the user's credentials are verified by the broker. Such topology information may include any information useful for configuring the GUI 203 for multiple monitors, such as for determining the position of the monitors relative to each other (e.g., which monitors are on right or left of each other, or on top or bottom of each other), for determining the pivot or orientation of monitors (which monitors are in horizontal orientation, which monitors are in vertical orientation), and/or for determining which monitor should be primary, etc. For example, the user can be prompted to input whether the added monitor should be on the right or on the left of the first monitor, or on top or bottom, and which monitor should be primary. The user can also be asked to input whether the added monitor should be in horizontal or vertical orientation. The user can also be asked to input whether the first monitor should be in horizontal or vertical orientation.

Further, in the same way as was described with respect to client 1 220 in FIG. 2A, client 2 221 can collect various topology information (such as window 2 251 size) corresponding to the window 2 251 and convey this information to the agent 212.

Thus, the user-provided topology information as well as the client-provided topology information can be conveyed by client 2 221 to the agent 212. The agent 212 can then use the received topology information to reconfigure or extend the GUI 203 to two-monitor mode. For example, the agent can provide the topology information to the guest OS 214 and invoke extended monitor functionality of the guest OS 214 to extend the GUI 203 to two monitors based on the received client- and user-provided topology information.

Further, in various embodiments, user inputs (such as mouse, keyboard, or other inputs) can be conveyed to the desktop 202 via either session 1 or session 2. For example, user inputs at the client device 210 that are targeted for the virtual desktop 202 can be conveyed by client 1 220 or by client 2 221 to the agent 212 (or by both clients 220, 221). The agent 212 can inject the user inputs into the desktop 202, thereby allowing the user to provide inputs to the desktop 202.

Thus, in this embodiment, a user is able to extend the GUI 203 of the remote desktop 202 to two monitors (230 and 231) and view each monitor in a separate client window (250 and 251) on her client device 210. If the user has two displays connected to the client device 210, the user can place one client window (e.g., 250) in one display and the other client window (e.g., 251) in the other display and maximize each window (250 and 251) in each display, thereby achieving a multi-monitor configuration on the client device 210 matching the GUI 203 of the virtual desktop 202.

For example, a user may have a client device 210, to which two side-by-side displays are connected. To initiate a session with the remote desktop 202, the user may open client 1 220, maximize the client window 250 in a display, e.g., the left display, log into the remote desktop 202 via the client 1 220, and view the single monitor 230 of the remote desktop GUI 203 in the client window 250 on the left display. At this point, the remote desktop 202 is in single monitor mode and the single monitor (e.g., monitor 1 230) is streamed to client 1 220 to be displayed in client 1 window 250 on the left display, while the user inputs are conveyed to the remote desktop 202 by the client 220.

To extend the desktop 202 to an additional monitor, the user can open another client (e.g., client 2 221) in the second display (on the right), maximize the client window (e.g., 251) in the second display, log into the remote desktop 202 via the second client 2 221, confirm that she would like to extend the session to an additional client (instead of stealing a session), and provide topology information (e.g., indicate when prompted that the second client window 251 is on the right of the first client window 250). The agent 212 processes the request for the second session and extends the remote desktop GUI 203 to a second monitor 2 231 to the right of the first monitor 1 230 based on the user-provided topology information. The agent 212 can also receive and use client-provided topology information (such as size of windows 250, 251) when configuring the remote desktop GUI 203 for multiple monitors. Consequently, the user can view the second monitor 231 of the remote desktop GUI 203 in the second client window 2 251 on the right display and the first monitor 1 230 of the remote desktop GUI 203 in the first client window 1 250 in the left display. In various embodiments, user inputs can continue to be transmitted to the agent 212 via client 1 220 or switched to be transmitted via client 2 221, or inputs can be transmitted via both clients 220, 221.

Figure 2C:
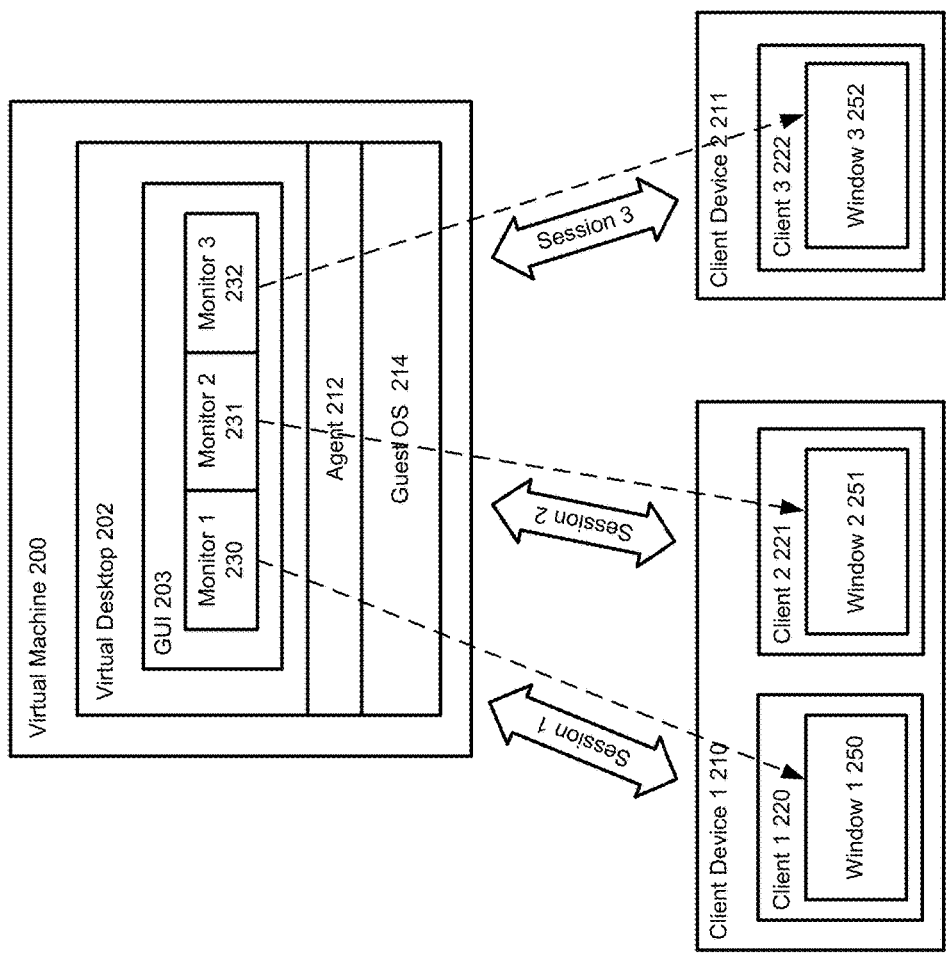
FIG. 2C illustrates an example of two clients on a client device and a third client on another client device connected to an extended virtual desktop in a three monitor configuration, in accordance with various embodiments.

FIG. 2C illustrates an example of one client device executing two clients and another client device executing a third client connected to an extended virtual desktop in a three monitor configuration, in accordance with various embodiments. FIG. 2C illustrates the client device 210 executing two clients 220, 221 and virtual desktop 202 described in FIG. 2B, now extended to a three monitor configuration. In various embodiments, to extend the desktop 202 to a third monitor 3 232 (i.e., to configure the GUI 203 in three monitor mode), the user can open a third client 3 222 on a second client device 2 211. For example, the user may have a tablet, laptop, smartphone, another desktop, or another computing device (other than the client device 210), and use this device as a second client device 2 211 for extending the virtual desktop 202. Hence, the user can open a client 3 222 on the second client device 2 211. The client 3 222 may be a web client, in which case the user opens a web browser on the client device 2 211. If the client 3 222 is a native client, the user opens a native client application on client device 2 211. Notably, any of clients 1 220, 2 221, and 3 222 may be either a web client or a native client, i.e., there can be a mix of types of clients.

Once the third client 3 222 is opened on client device 2 211, the user can log into the remote desktop 202 through the third client 3 222 (e.g., by providing login credentials to the connection broker). In various embodiments, when the connection broker detects that a third login is being requested to the same virtual desktop 202 (after determining that the supplied credentials are correct) the connection broker can request the user to identify (e.g., via an on-screen prompt), whether the user prefers to steal the session from client 1 220 and/or client 2 221 or to extend the session to the additional client 3 222. If the user chooses to steal the session, then the connection broker can terminate the session with client 1 220 and/or client 2 221 and establish the session with client 3 222 in place of the terminated session(s). If the user chooses to extend the session to client 3 222, then the connection broker can allow the third session with client 3 222 while maintaining the first session with client 1 220 and second session with client 2 221.

When the third session to the virtual desktop 202 is requested, the GUI 203 of the virtual desktop 202 can be extended to a third monitor 3 232, and the third monitor 3 232 can be transmitted via the third session while the first monitor 1 230 is transmitted via the first session and the second monitor 2 231 is transmitted via the second session. Hence, the desktop 202 can be extended to three monitors (230, 231, and 232) in the virtual machine 200 on the server, and each monitor can be conveyed to and displayed by a separate client (220, 221, and 222) on corresponding client device 1 210 and client device 2 211. As illustrated by the broker arrow, monitor 3 232 can be transmitted or streamed via session 3 to a window 3 252 of the third client 3 222 in the client device 2 211. For example, display updates of monitor 3 232 can be conveyed to client 3 222 and displayed in the client 3 window 252. Meanwhile, the first monitor 1 230 can be streamed or transmitted via session 1 to the first client 1 220 to be displayed in window 1 250 and the second monitor 2 231 can be streamed or transmitted via session 2 to the second client 2 221 to be displayed in window 2 251 of client device 1 210.

For example, when the agent 212 detects or is notified by the connection broker that a third connection to the virtual desktop 202 is being established, the agent 212 can reconfigure the desktop 202 to three monitor mode. For example, the agent can do this by communicating with or invoking certain operation of the guest OS 214.

In various embodiments, the user can be prompted (e.g., by an on-screen prompt) to supply various topology information that can be used (e.g., by the agent 212 and/or by the guest OS 214) to configure the GUI 203 of the virtual desktop 202 for multi-monitor mode. In an embodiment, such a prompt can be presented to the user when the user attempts to establish the third connection to the desktop 202, after the user's credentials are verified by the broker. Such topology information may include any information useful for configuring the GUI 203 for multiple monitors, such as for determining the position of the monitors relative to each other (e.g., which monitors are on right or left of each other, or on top or bottom of each other), and/or for determining the pivot or orientation of monitors (which monitors are in horizontal orientation, which monitors are in vertical orientation), which monitor should be primary, etc. Hence, the user can indicate, when prompted, where the first client window 250, the second client window 251, and the third client window 252 are in relation to each other, the orientation/pivot of the windows 250, 251, 252, which window is primary, etc.)

For example, the user can be prompted to input whether the added monitor should be on the right, on the left, or between the first and second monitors, or on top or bottom of either monitor, and which monitor should be primary. The user can also be asked to input whether the added monitor should be in horizontal or vertical orientation. The user can also be asked to input whether the first and second monitors should be in horizontal or vertical orientation. Thus, in various embodiments, the user can be allowed to arrange all three monitors in any desirable configuration.

Further, in the same way as was described with respect to client 1 210 in FIG. 2A, and client 2 211 in FIG. 2B, client 3 222 can collect various topology information (such as window 3 252 size) corresponding to the window 3 252 and convey this information to the agent 212.

Thus, the user-provided topology information as well as the client-provided topology information can be conveyed by client 3 222 to the agent 212. The agent 212 can then use the received topology information to reconfigure or extend the GUI 203 to three-monitor mode. For example, the agent can provide the topology information to the guest OS 214 and invoke extended monitor functionality of the guest OS 214 to extend the GUI 203 to three monitors based on the received client- and user-provided topology information.

Further, in various embodiments, user inputs (such as mouse, keyboard, or other inputs) can be conveyed to the desktop 202 via either session 1, session 2, or session 2. For example, user inputs that are targeted for the virtual desktop 202 can be conveyed by client 1 220, by client 2 221, or by client 3 222 to the agent 212 (or by each client 220, 221, 222). The agent 212 can inject the user inputs into the desktop 202, thereby allowing the user to provide inputs to the desktop 202.

Thus, in this embodiment, a user is able to extend the GUI 203 of the remote desktop 202 to a third monitor 3 232 and view the monitor in a client window 3 252 on a second client device 2 211. If the user has two displays connected to client device 1 210, the user can place one client window (e.g., 250) in one display and the other client window (e.g., 251) in the other display and maximize each window (250 and 251) in each display. Then the user can maximize the window 3 252 of client 3 222 in a display of client device 2 211, thereby achieving a three monitor, multi-monitor configuration on the client devices 210, 211 matching the GUI 203 of the virtual desktop 202.

For example, as described in the example of FIG. 2B, a user may have a client device 210, to which two side-by-side displays are connected, where the desktop 202 is in two monitor mode with one monitor 230 being streamed to one client 1 220 and displayed in a window 250 on the first display of the client device 1 210 (e.g, on the left) and the other monitor 2 231 being streamed to the other client 2 221 and being displayed in a window 251 on the second display of the client device 1 210 (e.g, on the right). User inputs may be conveyed to the remote desktop 202 by either client 1 220, client 2 221, or both clients.

If the user desires to extend the desktop 202 to the display of another device (other than 210), such as a tablet, smartphone, laptop, etc., the user can open another client (e.g., client 3 222) on the second device 2 211, maximize the client window 252 in the display of the second device 211, log into the remote desktop 202 via the third client 3 222, confirm that she would like to extend the session to an additional client (instead of stealing a session), and provide topology information (e.g., indicate when prompted that the third window 252 is to be to the right of the second window 251). The agent 212 can process the request for the third session and extend the remote desktop 202 to a third monitor 3 232 to the right of the second monitor 2 231 based on the user-provided topology information. The agent 212 can also receive and use client-provided topology information (such as size of windows 250, 251, 252) when configuring the remote desktop GUI 203 for multiple monitors. Consequently, the user can view the third monitor 3 232 of the remote desktop GUI 203 in the third client window 3 252 on a screen of the second client device 2 211, the first monitor 1 230 of the remote desktop GUI 203 in the first client window 1 250 on a screen of the first client device 1 210, and the second monitor 2 231 of the remote desktop GUI 203 in the second client window 2 251 on a screen of the first client device 1 210. In various embodiments, user inputs can continue to be transmitted to the agent 212 in the same way as they were before the third session was added, or switched to be transmitted via client 3 222, or inputs can be transmitted via all three clients 220, 221, and 222. Notably, in embodiments where a separate client device is added, such as device 2 211, it may be preferable to allow the user to submit inputs to the desktop 202 via either client device 1 210 or client device 2 211.

As will be appreciated by those skilled in the art, while FIGS. 2A through 2C illustrate an example of a desktop 202 being extended across two clients 220, 221 on one device 210, and then across a third client 3 222 on a second device 2 211, the systems and methods described herein can be utilized for extending desktops in other configurations of clients and devices. Namely, the techniques described herein can be used to extend a virtual desktop across any combination of separate client devices, and across any number of clients on each device, with each client capable of being a web client or a native client. For example, a user may be able to have an extended desktop while utilizing only web clients. The desktop may also be extended across different, separate devices. In an example scenario, a user may be able to access a desktop in one monitor mode from a first client (web client) on a first device (laptop computer), then extend the desktop to a second client (native client) on a second device (desktop computer), then extend the desktop to a third client (web client) on the same desktop (on a second display connected to the desktop), then extend the remote desktop to a fourth client (web client) on a third device (tablet), and so on.

As a result, numerous advantages are realized. For example, the user is able to extend the remote desktop while utilizing web clients. Hence, users who don't have access to a native client, or who prefer not to download, install, or use a native client are still able to enjoy a multi-monitor configuration of a remote desktop. Further, users are able to utilize other devices for displaying extended monitors. For example, a user who doesn't have two displays connected to a primary computer can use a tablet, a smartphone, or another computer for displaying an extended screen. Even users who have multiple displays connected to a primary computer may benefit from being able to extend a desktop to yet another display, such as a tablet.

Looking again at FIG. 2C, after the three sessions are established, one or more of the sessions may become disconnected. For example, this may be due to the user terminating a session or turning off a device (e.g., 210, 211), or due to other factors such as poor connectivity, etc. In various embodiments, when this happens, the agent 212 can reconfigure the topology of the desktop GUI 203 to exclude the monitor (e.g., 230, 231, or 232) corresponding to the terminated session. For example, if session 3 is terminated, the agent 212 can reconfigure the desktop 202 from three monitor mode to two monitor mode with monitor 1 230 and monitor 2 231, so that the user can continue to interact with the desktop 202 via session 1 and session 2.

Figure 3:
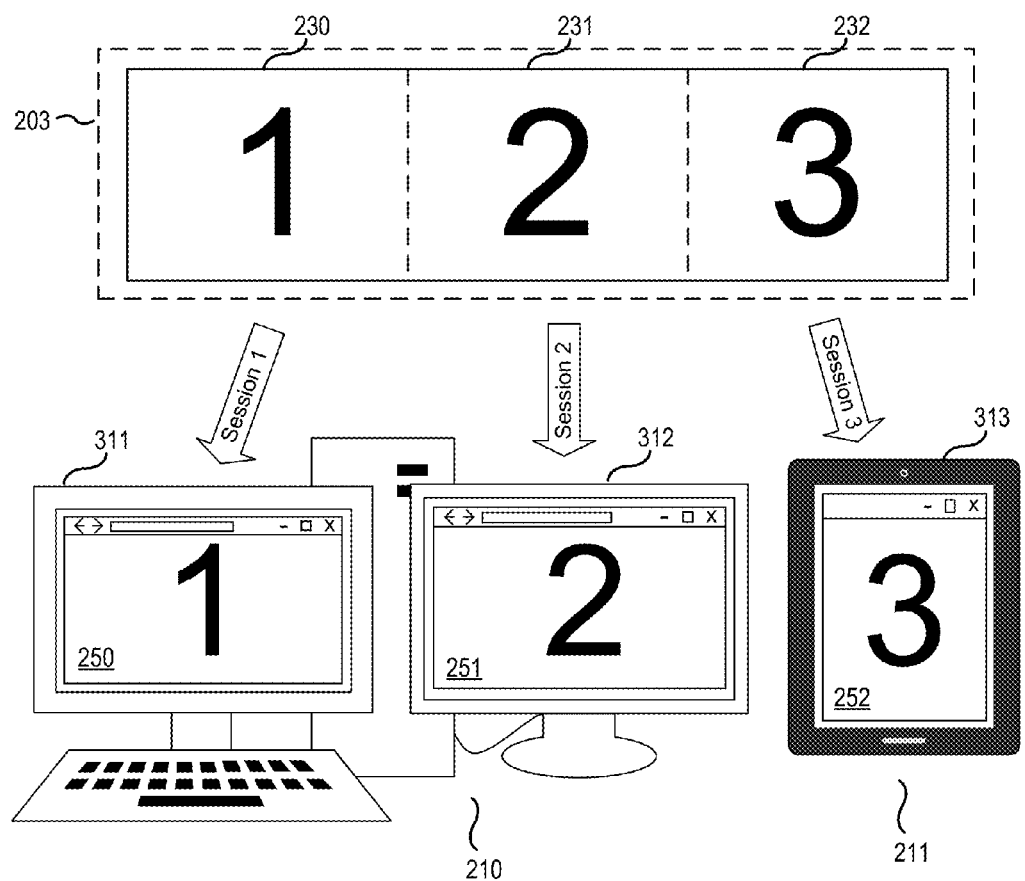
FIG. 3 illustrates an example of a GUI of a remote desktop in three monitor mode that is transmitted across three client device displays, in accordance with various embodiments.

FIG. 3 illustrates an example of a GUI of a remote desktop in three monitor mode that is transmitted across three client device displays, in accordance with various embodiments. For example, the remote desktop and client device displays illustrated in FIG. 3 can correspond to the remote desktop 202 and client devices 210, 211 described in FIG. 2C. As illustrated in the example of FIG. 3, a GUI 203 of a desktop (e.g., 202 in FIG. 2C) is in three monitor mode, with monitors 230, 231, and 232. The monitors (230, 231, 232) are streamed via session 1, session 2, and session 3, respectively, to client devices 210 and 211 (e.g., 210 and 211 of FIG. 2C). Client device 210 may be a desktop computer, to which two monitors (311 and 312) and connected. Monitor 1 230 is streamed from the remote desktop 202 via session 1 to a first client 220 (FIG. 2C) in client device 210 and its content (the number "1") is displayed in a window 250 of the first client 220 in monitor 311. The client 220 in this case is a web client; hence, the window 250 is a window of a web browser. In other embodiments, the client 220 could be a native client.

Monitor 2 231 is streamed from the remote desktop 202 via session 2 to a second client 221 (FIG. 2C), also in client device 210 and its content (the number "2") is displayed in a window 251 of the second client 221 in monitor 312. The client 221 in this case is a web client; hence, the window 251 is a window of a web browser. In other embodiments, the client 221 could be a native client.

Monitor 3 232 is streamed from the remote desktop 202 via session 3 to a third client 222 (FIG. 2C) in client device 211, in this case a tablet computer, and its content (the number "3") is displayed in a window 252 of the third client 222 in the display 313 of device 211. The client 222 in this case is a native client; hence, the window 252 is a window of a native client application. In other embodiments, the client 222 could be a web client.

Figure 4:
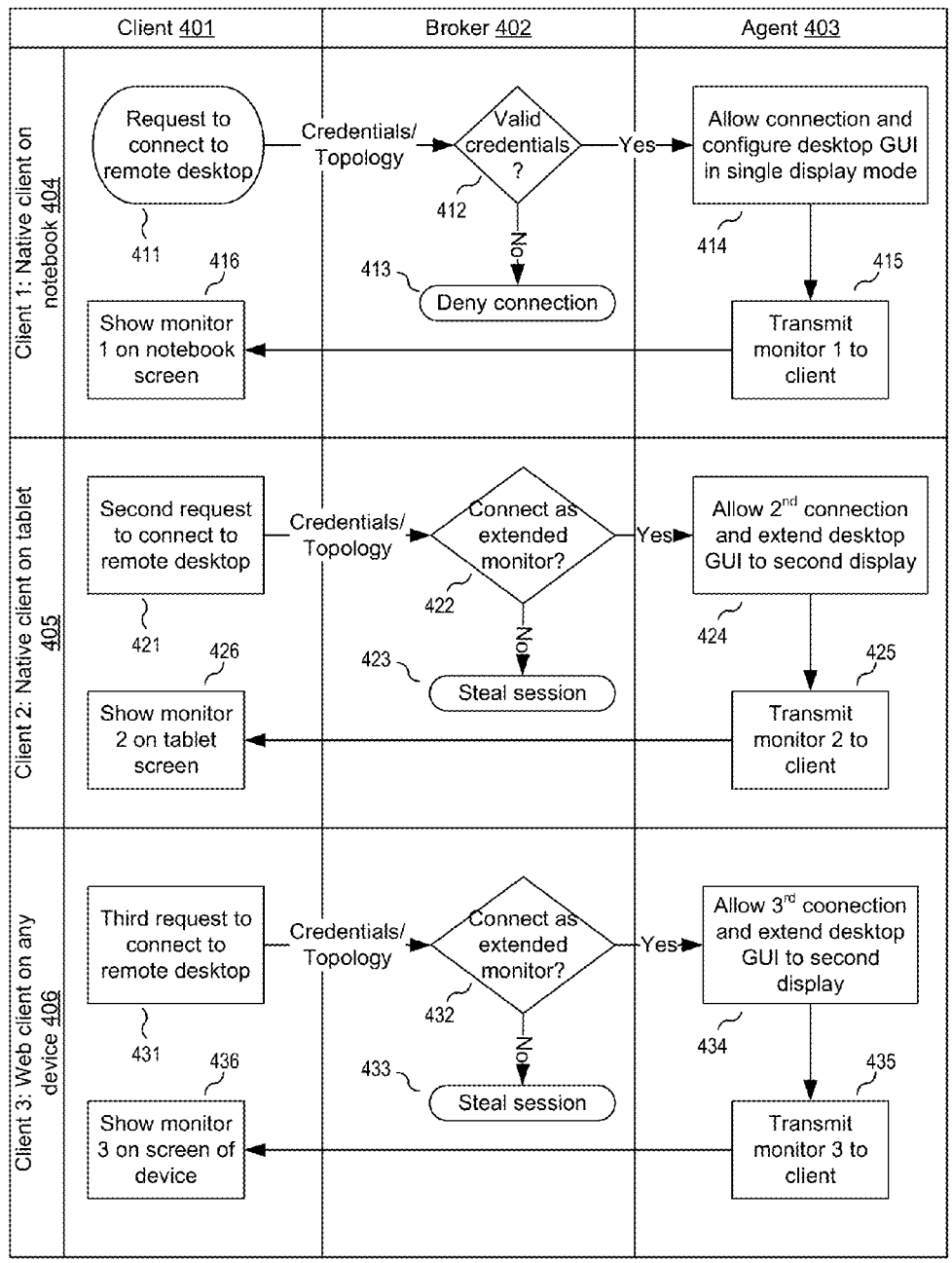
FIG. 4 illustrates an example swim lane diagram of a process flow for extending a remote desktop to three monitors, in accordance with various embodiments.

FIG. 4 illustrates an example swim lane diagram of a process flow for extending a remote desktop to three monitors, in accordance with various embodiments. The example diagram of FIG. 4 includes three columns; a client column 401, which lists processes corresponding to activities performed by clients; a broker column 402, which lists processes corresponding to activities performed by the broker; and an agent column 403, which lists processes corresponding to activities performed by the agent. The diagram further includes three rows; a client 1 row 404, which lists processes corresponding to a first client, which in this case is a native client on a notebook computer; a client 2 row 405, which lists processes corresponding to a second client, which in this case is a native client on a tablet computer; a client 3 row 406, which lists processes corresponding to a third client, which in this case is a web client on any computing device including the notebook of client 1, the tablet of client 2, or any other device.

It should be noted that the process described in FIG. 4 could apply in a system with different types of clients and client devices than listed in FIG. 4, and the particular arrangement of clients and devices is only provided by way of example. For example, in other embodiments, any clients can be either native clients or web clients. The clients can also be located on different types of devices, and any number of the clients may be located on the same device.

As illustrated in the example of FIG. 4, a request to connect to the remote desktop 411 can be produced in the first client, the native client executing on the notebook. For example, the request can be produced when a user of the notebook on which the client is running attempts to log into the remote desktop via the client. Login credentials (e.g., a username and password) can be conveyed from the client to the broker in step 411. Further, topology information for configuring the desktop GUI can be conveyed to the broker as well. For example, the topology information can include client-provided information regarding a window of the client, such as the size of the window.

In decision 412, the broker determines if the supplied credentials are valid. If the broker validates the credentials, then the broker allows the connection between the client and the agent in step 414. The broker also conveys the topology information to the agent. It should be noted that, in other embodiments, the client can send topology information directly to the agent once the connection is established instead of sending the information through the broker. Also, after the connection is established, the client can send updates to topology information, e.g., if the client window size is changed. If the broker does not validate the connection, then in step 413, the connection is denied.

Once the connection is established, in step 414, the agent configures the desktop GUI in single display mode, since only one client connection to the desktop is present. The agent also takes into account the provided topology information when configuring the desktop. Once the GUI is configured, in step 415 the agent transmits the single monitor of the GUI, monitor 1, to the client. In step 416, the client shows the transmitted monitor 1, i.e., the graphical data of monitor 1, on a screen of the notebook.

At this point, the remote desktop is in one monitor mode, with the single monitor being streamed to the native client on the notebook and displayed on a screen of the notebook. Although not illustrated, user inputs can be conveyed from the client on the notebook to the agent on the remote desktop. The agent can then inject the inputs into the remote desktop to produce the user inputs in the desktop.

In operation 421, a second request to connect to the remote desktop can be produced in the second client, the native client executing on the tablet. For example, the request can be produced when a user of the tablet on which the client is running attempts to log into the remote desktop via the client. The user may be logging in from the tablet in order to extend the session to the screen of the tablet or to steal the session. For example, the same login credentials as conveyed from client 1 (e.g., username and password) can be conveyed from the client to the broker in order to connect to the same remote desktop. When the second login to the desktop is detected by the broker, the broker can determine, in decision 422, whether the second session should be connected as an extended monitor or whether the second session should steal the first session. For example, the user can be provided with a prompt asking the user whether she prefers to connect the second client as an extended monitor or to steal the session. If the user replies that she would like to steal the session, then in operation 423, the broker can steal the session. For example, stealing the session may be performed by the broker by terminating the session with the first client and establishing the session with the second client. In this case, the desktop GUI would be configured in a single monitor mode, with the single monitor being transmitted to the client 2 window on the tablet.

Further, topology information for configuring the desktop GUI can be conveyed to the broker as well. For example, the topology information can include client-provided information regarding a window of the second client, such as the size of the window. Further, user-provided topology information can be conveyed from the second client to the broker to indicate various GUI configuration parameters, such as the location of the client 2 window with respect to the client 1 window, the pivot of the client 2 window, the pivot of the client 1 window, and so on. As described previously, the user can be presented with a prompt to collect the user-provided topology information.

In operation 424, if the broker determines (e.g., based on the user input) that the second client is to be connected as an extended monitor, then the broker can extend the desktop GUI to a second display and allow the second connection between the second client and the agent. The broker also conveys the client-provided and user-provided topology information to the agent, based on which information the agent can determine the appropriate configuration of the desktop GUI. It should be noted that, in other embodiments, the client can send topology information directly to the agent once the connection is established instead of sending the information through the broker. Also, after the connection is established, any connected clients can send updates to topology information, e.g., if the window size corresponding to either client is changed.

Once the GUI is configured for two monitor mode, in step 425, the agent transmits the second monitor of the GUI, monitor 2, to the client. In step 426, the client shows the transmitted monitor 2 on a screen of the tablet.

At this point, the remote desktop is in two monitor mode, with monitor 1 being streamed to the native client on the notebook and displayed on a screen of the notebook and monitor 2 being streamed to the native client on the tablet and displayed on a screen of the tablet. Although not illustrated, user inputs can be conveyed from any or all clients (notebook and/or tablet) to the agent on the remote desktop. The agent can then inject the inputs into the remote desktop to produce the user inputs on the desktop.

In operation 431, a third request to connect to the remote desktop can be produced in the third client, which can be a web client on any device. For example, the web client can be executing on either the tablet or the notebook of client 2 and client 1, respectively, or on a different device. For example, the request can be produced when a user attempts to log into the remote desktop via the web client. The user may be logging in from the web client in order to extend the session to the window of the web client or to steal the session. For example, the same login credentials as conveyed from client 1 and client 2 (e.g., a username and password) can be conveyed from the third client to the broker in order to connect to the same remote desktop. When the third login to the desktop is detected by the broker, the broker can determine, in decision 432, whether the third session should be connected as an extended monitor or whether the third session should steal the first and/or second sessions. For example, the user can be provided with a prompt asking the user whether she prefers to connect the third client as an extended monitor or to steal the session from either or both of the first two clients. If the user indicates that she would like to steal the session, then in operation 433, the broker can steal the session. For example, stealing the session may be performed by the broker by terminating the session with the first and/or second client and establishing the third session with the third client. In this case, the desktop GUI would be configured in a one monitor or two monitor mode (depending on whether both or just one of the client 1 and client 2 sessions was terminated), with the corresponding GUI monitors being transmitted to the corresponding remaining clients.

Further, topology information for configuring the desktop GUI can be conveyed to the broker as well. For example, the topology information can include client-provided information regarding a window of the third client, such as the size of the window. Further, user-provided topology information can be conveyed from the third client to the broker to indicate various GUI configuration parameters, such as the location of the client 3 window, client 2 window, and client 1 window with respect to each other, the pivots of the client 3 window, client 2 window, and client 1 window, which client is primary, and so on. As described previously, the user can be presented with a prompt to collect the user-provided topology information.

In operation 434, if the broker determines (e.g., based on the user input) that the third client is to be connected as an extended monitor, then the broker can extend the desktop GUI to a third display and allow the third connection between the third client and the agent. The broker also conveys the client-provided and user-provided topology information to the agent, based on which information the agent can determine the appropriate configuration of the desktop GUI. It should be noted that, in other embodiments, the client can send topology information directly to the agent once the connection is established instead of sending the information through the broker. Also, after the connection is established, any connected clients can send updates to topology information, e.g., if the window size corresponding to either client is changed.

Once the GUI is configured for three monitor mode, in step 435, the agent transmits the third monitor of the GUI, monitor 3, to the client. In step 436, the web client shows the transmitted monitor 3 on a screen of the device executing the web client.

At this point, the remote desktop is in three monitor mode, with monitor 1 being streamed to the native client on the notebook and displayed on a screen of the notebook, monitor 2 being streamed to the native client on the tablet and displayed on a screen of the tablet, and monitor 3 being streamed to the web client and displayed on a screen of the device executing the web client. Although not illustrated, user inputs can be conveyed from any or all clients (notebook, tablet, and/or device executing web client) to the agent on the remote desktop. The agent can then inject the inputs into the remote desktop to produce the user inputs on the desktop.

In various embodiments, client-side devices, such as Universal Serial Bus (USB) devices, webcam devices, audio-in devices, printer devices, client drive devices, etc. can be redirected from the client devices (e.g., 210, 211) to the remote desktop (e.g., 202) in a way such that a user is able to use these devices in the remote desktop in the same way as when using them locally. Various considerations need to be taken into account when redirecting client-side devices to a remote desktop in a multi-monitor configuration where the remote desktop is accessed by clients from multiple computing devices.

In various embodiments, USBs from each of multiple connected client computing devices (e.g., 210, 211) can be redirected to the remote desktop (e.g., 202), such that a USB device connected to either of the multiple client computing devices (e.g., 210, 211) is redirected to and is available in the remote desktop. Hence, a USB device connect to either of multiple client computing devices (e.g., 210, 211) will be available through any of the multiple clients (e.g., 220, 221, 222) because each client is connecting to the same guest OS (e.g., 214).

In various embodiments, a similar scenario can be applied to connected printers as for USBs. For example, printers attached to any of the multiple client computing devices (e.g., 210, 211) can be mapped to the remote desktop (e.g., 202) automatically, without user interaction. Henceforth, all printers mapped from any of the client computing devices (e.g., 210, 211) can be accessed with each client (e.g., 220, 211, 222).

In various embodiments, a similar scenario can be applied to client side drives as for USBs and printers. For example, client side drives of any of the multiple client computing devices (e.g., 210, 211) can be redirected to the remote desktop (e.g., 202). Henceforth, all client side drives of each client computing device (e.g., 210, 211) can be shared within each client (e.g., 220, 211, 222).

In various embodiments, for devices such as RTAV (Real-Time Audio-Video), webcam, and audio-in devices, each webcam/audio-in device of each client computing device (e.g., 201, 211) can be redirected to the remote desktop (e.g., 202). However, because there may only be one virtual webcam driver and virtual microphone in the desktop (e.g., 202), only one of the webcams/audio-in devices can be used at the same time across all the devices (e.g., 210, 211). Hence, in various embodiments, webcam/audio-in devices might not be redirected until they are requested by video/audio applications within the remote desktop (e.g., 202). Further, after a user closes the video/audio application using the webcam/audio-in device, the virtual webcam/virtual microphone in the guest OS (e.g., 214) will be released, and therefore a webcam/audio-in device of another client computing device (e.g., 210, 211) can be used in a corresponding client (e.g., 220, 221, 222) of the other client computing device (e.g., 210, 211).

In various embodiments, remote desktop (e.g., 202) side data can be redirected to certain client (e.g., 220, 221, 222) side devices, such as audio-out devices. For example, instead of directing audio data to client side devices of all connected clients, audio data can be encoded at the remoted desktop (e.g., 202), sent to the particular client (e.g., one of 220, 221, 222) in which the user is playing the audio, and then decoded and played in the audio-out devices of the computing device (e.g., 210, 211) of the particular client (e.g., one of 220, 221, 222).

In various embodiments, remote desktop (e.g., 202) side data can be redirected to certain client (e.g., 220, 221, 222) side devices when performing MMR (Multi-Media redirection). Generally, with MMR, when a user plays video/audio data from a remote desktop (e.g., 202), the data is actually decoded and played via the client (e.g., 220, 221, 222) side devices to promote performance. For MMR in a multi-monitor implementation, a multi-media file played by a user from a particular client (e.g., 220, 221, 222) may be redirected to the client side devices of the computing device (e.g., 210, 211) of the particular client (e.g., 220, 221, 222), instead of, for example, being directed to client side devices of all connected clients.

Figure 5:
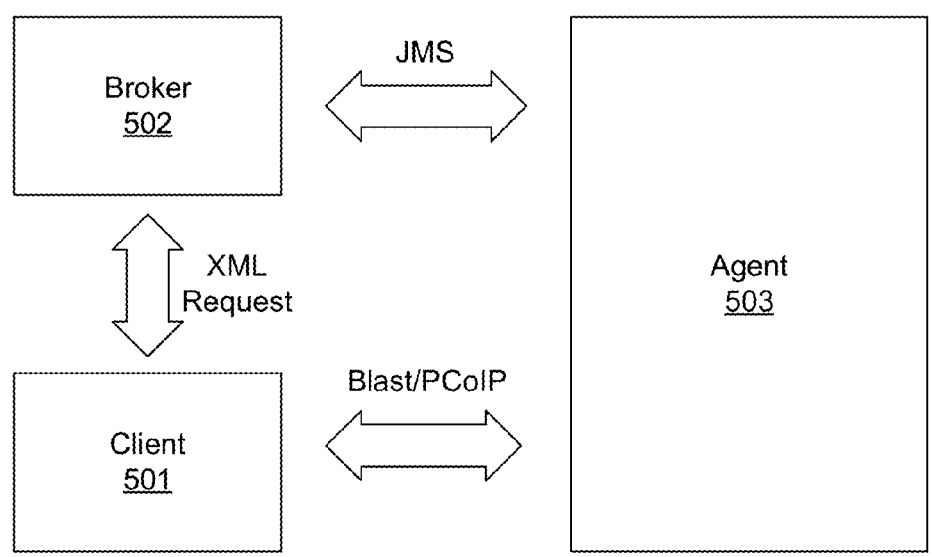
FIG. 5 shows an example of a simplified client, agent, and broker architecture, in accordance with various embodiments.

FIG. 5 shows an example of a simplified client, agent, and broker architecture, in accordance with various embodiments. As illustrated in the example of FIG. 5, the client 501 and the broker 502 can use Extensible Markup Language (XML) requests to communicate via an XML API (application programming interface), while the broker 502 and agent 503 can use JMS (Java Message Queue) to communicate. Data between the client 501 and the agent 503 can be transferred via the PC-over-IP (PCoIP) protocol and/or the Blast protocol (developed by VMware, Inc.).

In various embodiments, to achieve multi-monitor remote desktop sessions, the broker 502 and agent 503 need to handle multiple connections from clients (e.g., client 501 and other clients, not pictured) using the same user account. The first client (e.g., 501) connection to the remote desktop can be handled the same way as with traditional, single monitor technologies. For example, the agent 503 can create a VNC (Virtual Network Computing) backend and bind it to the default screen.

When a second client (not pictured) connects to the broker 502, the user can choose (or the system can otherwise determine) whether to steal the session from the previous client (e.g., 501) or to use the second client as a multi-monitor client. Stealing the session may be handled in the same way as done in existing technologies when a user logs into a remote desktop from a second client when she already has an active session via a first client. If the second connection is a multi-monitor connection (e.g., if the user indicates not to steal the session), the broker 502 can pass topology information (e.g., client-provided and user-provided topology information, as described above) to the agent 503. The agent 503 can extend the remote desktop to include a second monitor, with the monitors being configured based on the received topology information. Then, the agent 503 can create a new VNC backend and bind the connection with the second client to the second monitor. In the same way, the remote desktop can be extended to additional monitors.

If one of the clients (e.g., 501) disconnects from the agent 503, the agent service can destroy the monitor that is bound to the disconnected client (e.g., 501). Further, all windows on the destroyed monitor can be moved to other existing monitors automatically by the operating system window manager.

Figure 6:
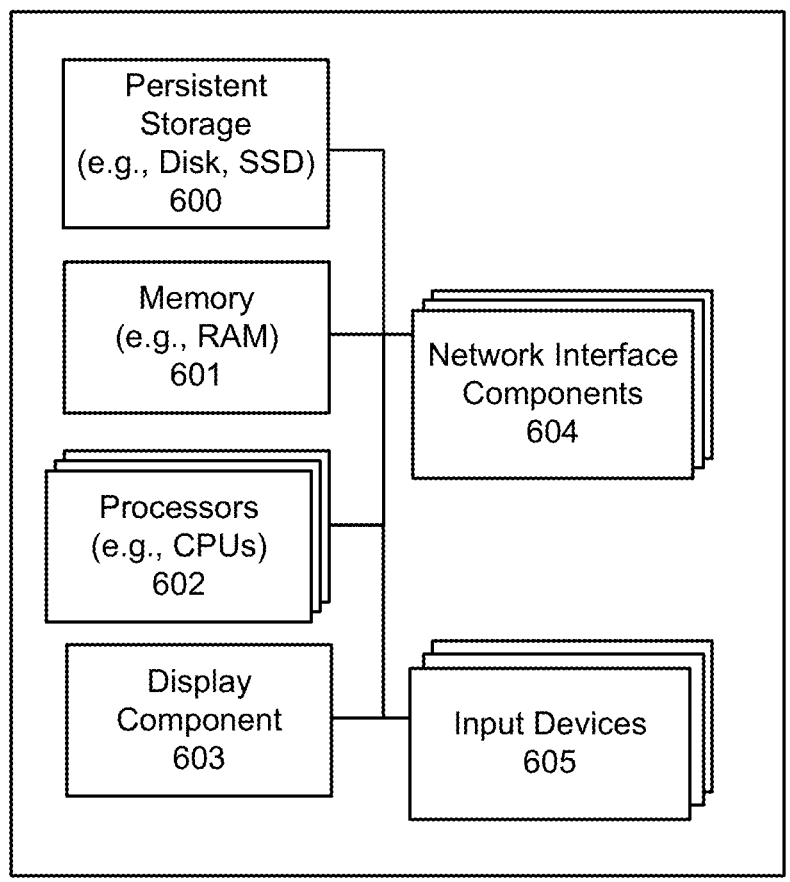
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method in a remote desktop environment for extending a virtual desktop hosted on a server to multiple monitors, comprising:
    establishing a first session between the virtual desktop and a first client executing on a first remote computing device, the virtual desktop being configured to produce a graphical user interface (GUI) in one monitor mode, wherein the GUI is streamed to the first client via the first session;
    receiving a request from a second client to initiate a second session with the virtual desktop;
    reconfiguring the virtual desktop to extend the GUI to two monitor mode including a first monitor and a second monitor;
    streaming graphical data of the first monitor of the GUI to the first client via the first session; and
    streaming graphical data of the second monitor of the GUI to the second client via the second session.

2. The method of claim 1, wherein:
    the first client is a web client and the second client is a web client; or
    the first client is a native client and the second client is a web client; or
    the first client is a web client and the second client is a native client.

3. The method of claim 1, wherein the second client executes on a second remote computing device separate from the first remote computing device.

4. The method of claim 1, wherein the first client is a web client and the second client is a web client also executing on the first remote computing device.

5. The method of claim 1, further comprising receiving topology information corresponding to the two monitor mode of the GUI, the topology information indicating at least the position of the first monitor and the second monitor relative to each other.

6. The method of claim 5, wherein the topology information is gathered from inputs provided by a user.

7. The method of claim 1, further comprising:
    in response to the request from the second client to initiate the second session, requesting user input to indicate whether the second session is to steal the first session or whether the second session is to be connected as an extended monitor; and
    receiving an indication from the user that the second session is to be connected as an extended monitor.

8. A computing device for extending a virtual desktop hosted on a server to multiple monitors in a remote desktop environment, comprising:
    at least one processor; and
    memory including instructions that, when executed by the at least one processor, cause the computing device to perform the steps of:
        establishing a first session between the virtual desktop and a first client executing on a first remote computing device, the virtual desktop being configured to produce a graphical user interface (GUI) in one monitor mode, wherein the GUI is streamed to the first client via the first session;
        receiving a request from a second client to initiate a second session with the virtual desktop;
        reconfiguring the virtual desktop to extend the GUI to two monitor mode including a first monitor and a second monitor;
        streaming graphical data of the first monitor of the GUI to the first client via the first session; and
        streaming graphical data of the second monitor of the GUI to the second client via the second session.

9. The computing device of claim 8, wherein:
    the first client is a web client and the second client is a web client; or
    the first client is a native client and the second client is a web client; or
    the first client is a web client and the second client is a native client.

10. The computing device of claim 8, wherein the second client executes on a second remote computing device separate from the first remote computing device.

11. The computing device of claim 8, wherein the first client is a web client and the second client is a web client also executing on the first remote computing device.

12. The computing device of claim 8, wherein the memory further includes instructions that when executed by the at least one processor, cause the computing device to perform the steps of:

receiving topology information corresponding to the two monitor mode of the GUI, the topology information indicating at least the position of the first monitor and the second monitor relative to each other.

13. The computing device of claim 12, wherein the topology information is gathered from inputs provided by a user.

14. The computing device of claim 8, wherein the memory further includes instructions that when executed by the at least one processor, cause the computing device to perform the steps of:
   in response to the request from the second client to initiate the second session, requesting user input to indicate whether the second session is to steal the first session or whether the second session is to be connected as an extended monitor; and
   receiving an indication from the user that the second session is to be connected as an extended monitor.

15. A non-transitory computer readable storage medium comprising one or more sequences of instructions, the instructions when executed by one or more processors causing the one or more processors to execute the operations of:
   establishing a first session between the virtual desktop and a first client executing on a first remote computing device, the virtual desktop being configured to produce a graphical user interface (GUI) in one monitor mode, wherein the GUI is streamed to the first client via the first session;
   receiving a request from a second client to initiate a second session with the virtual desktop;
   reconfiguring the virtual desktop to extend the GUI to two monitor mode including a first monitor and a second monitor;
   streaming graphical data of the first monitor of the GUI to the first client via the first session; and
   streaming graphical data of the second monitor of the GUI to the second client via the second session.

16. The non-transitory computer readable storage medium of claim 15, wherein:
   the first client is a web client and the second client is a web client; or
   the first client is a native client and the second client is a web client; or
   the first client is a web client and the second client is a native client.

17. The non-transitory computer readable storage medium of claim 15, wherein the second client executes on a second remote computing device separate from the first remote computing device.

18. The non-transitory computer readable storage medium of claim 15, wherein The method of claim 1, wherein the first client is a web client and the second client is a web client also executing on the first remote computing device.

19. The non-transitory computer readable storage medium of claim 15, further comprising instructions that when executed by the one or more processors cause the one or more processors to execute the operations of:
   receiving topology information corresponding to the two monitor mode of the GUI, the topology information indicating at least the position of the first monitor and the second monitor relative to each other.

20. The non-transitory computer readable storage medium of claim 19, wherein the topology information is gathered from inputs provided by a user.

* * * * *